(12) United States Patent
Hoofard et al.

(10) Patent No.: US 6,951,041 B2
(45) Date of Patent: Oct. 4, 2005

(54) VERTICALLY-STORING DOCK LEVELER APPARATUS AND METHOD

(75) Inventors: Richard K. Hoofard, Dallas, TX (US); James C. Alexander, Coppell, TX (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/444,971

(22) Filed: May 27, 2003

(65) Prior Publication Data

US 2004/0237223 A1 Dec. 2, 2004

(51) Int. Cl.⁷ .................................................. E01D 1/00
(52) U.S. Cl. ........................................................ 14/71.1
(58) Field of Search ................................ 14/69.5, 71.1, 14/71.3

(56) References Cited

U.S. PATENT DOCUMENTS

| | | | | |
|---|---|---|---|---|
| 3,334,368 A | | 8/1967 | McIntosh et al. ............... 14/71 |
| 3,368,229 A | | 2/1968 | Pfleger .......................... 14/71 |
| 3,475,778 A | | 11/1969 | Merrick et al. ................ 14/71 |
| 3,636,578 A | * | 1/1972 | Dieter .......................... 14/71.3 |
| 3,639,935 A | | 2/1972 | Kumpolt ........................ 14/72 |
| 3,766,585 A | | 10/1973 | Yoon ............................ 14/72 |
| 4,665,579 A | | 5/1987 | Bennett et al. ............... 14/71.1 |
| 4,689,846 A | | 9/1987 | Sherrod ........................ 14/71.3 |
| 4,776,052 A | * | 10/1988 | Delgado et al. .............. 14/71.3 |
| 4,825,493 A | | 5/1989 | Nguyen ........................ 14/71.3 |
| 4,928,340 A | | 5/1990 | Alexander .................... 14/71.3 |
| 5,001,799 A | | 3/1991 | Alexander et al. ........... 14/71.1 |
| 5,117,526 A | * | 6/1992 | Alexander .................... 14/71.7 |
| 5,313,681 A | * | 5/1994 | Alexander .................... 14/71.1 |
| 5,396,676 A | * | 3/1995 | Alexander et al. ........... 14/71.1 |
| 5,586,355 A | * | 12/1996 | Metz et al. .................... 14/69.5 |
| 6,205,606 B1 | * | 3/2001 | Zibella et al. ................. 14/71.3 |

OTHER PUBLICATIONS

Serco Brochure regarding R&M Series, pp. 1–3.
Serco Brochure regarding "E" Series, pp. 1–2.
Serco Brochure regarding later "E" Series, pp. 1–2.
Mrs. Baird's Bread Plant Photographs.

* cited by examiner

Primary Examiner—Gary S. Hartmann
(74) Attorney, Agent, or Firm—Baker & Hostetler LLP (57) ABSTRACT

A dock leveler for bridging the gap between a loading dock and the bed of a vehicle parked at the loading dock. The dock leveler is configured for installation on the top of the dock and is designed to rotate from a vertically-stored raised position to at least one lowered, operative position. In some embodiments, the dock leveler can be lowered either for normal operation so that the deck rests on the bed of the vehicle or it can be lowered to accommodate an end-loading condition.

5 Claims, 7 Drawing Sheets

FIG. 12

VERTICALLY-STORING DOCK LEVELER APPARATUS AND METHOD

FIELD OF THE INVENTION

The present invention relates generally to dock levelers. More particularly the present invention relates to vertically-storing dock levelers. The present invention also relates to dock levelers that do not require a pit for installation.

BACKGROUND OF THE INVENTION

Dock levelers are used at loading docks to bridge the gap between a loading dock and the bed of a vehicle parked at the loading dock to facilitate the loading or unloading of the vehicle. For example, dock levelers enable material handling equipment, such as a fork truck, to move between the dock and the vehicle bed.

Installation of dock levelers generally falls into two categories: pit-style dock levelers and edge-of-dock levelers. Pit-style dock levelers are installed in a pit or cavity below the level of the dock floor so that the top of the dock leveler is at dock level when stored. Pit-style dock levelers are typically configured to store horizontally, but some pit-style dock levelers store vertically. Examples of pit-style dock levelers are described in U.S. Pat. Nos. 3,368,229 and 4,928,340. Examples of vertical-storing dock levelers are found in U.S. Pat. Nos. 4,825,493 and 5,001,799. Pit-style dock levelers generally have the ability to service transport vehicles up to twelve inches above or below dock level. These dock levelers are typically activated by hydraulic, pneumatic, or mechanical spring systems. Pit-style dock levelers can be expensive to install due to the expense of the pit. Pit-style dock levelers, particularly horizontally-storing pit-style dock levelers, can also have the drawback of being more difficult to ensure security and environmental control.

Edge-of-dock levelers are attached to the dock wall and therefore do not require a pit or shelf for installation. Examples of edge-of-dock levelers can be found in U.S. Pat. Nos. 4,665,579 and 4,689,846. Edge-of-dock levelers are typically smaller and of simpler construction than pit-style dock levelers. A drawback of edge-of-dock levelers is that they can have limited range above and below dock and steeper grades for fork trucks traveling over them.

A third type of dock installation that is known, but not widely used, is the horizontally-storing top-of-dock leveler. It is typically similar in construction to a horizontally-storing pit-style dock leveler but mounted on top of the dock without a pit. Top-of-dock levelers generally have limited below dock range and are generally used to service standard height trucks from a low dock. Also, top-of-dock levelers are generally used on an indoor dock, otherwise it requires that the door be modified to close properly.

Accordingly, it is desirable to provide a method and apparatus for bridging the gap between a dock and the end of a vehicle bed that can be installed economically such as with an edge-of-dock leveler, but which has greater vertical range and less steep grades than edge-of-dock levelers. It is also to desirable that the method and apparatus provide the security and environmental control of a vertically-storing dock leveler.

SUMMARY OF THE INVENTION

The foregoing needs are met, to a great extent, by the present invention, wherein in one aspect an apparatus and method for bridging the gap between a dock and the end of a vehicle is provided that in some embodiments can be installed economically such as with edge-of-dock levelers, but which has greater range and less steep grades than edge-of-dock levelers.

In accordance with one embodiment of the present invention, a dock leveler is provided having a vertically-storing deck assembly pivotally connected to a base assembly, wherein the base assembly is configured to be installed on the top surface of a dock. Preferably, the deck assembly can pivot between the vertically-stored position, and lower, operating positions. In some embodiments, the lower, operating positions range from about six inches above dock to about eight inches below dock. In some embodiments, the deck assembly is pivotally attached to the base assembly at a moveable pivot axis, such that pivot axis can shift from a first position in the base assembly near the end of the dock to a second position in the base assembly farther from the end of the dock. Shifting the pivot axis from the first to the second position effectively reduces the distance the bridge formed by the deck assembly extends in front of the dock face. In some embodiments, the dock leveler also includes a lip assembly pivotally attached to the deck assembly. Pivotal rotation of the lip from an extended to a pendant position effectively shortens the length of the bridge (and thus reduces the distance the bridge extends in front of the dock face) formed by the deck assembly.

In accordance with another embodiment of the present invention, a dock leveler is provided comprising a base means for securing the dock leveler to a top surface of a dock, a vertically-storing means for bridging the gap between a dock and a vehicle backed against a dock, and a means for pivotally attaching the vertically-storing means to the base means. In some embodiments, the dock leveler also includes a means for varying the length of the bridge formed by the deck assembly. In some embodiments, the length-varying means is a lip assembly pivotally attached to the vertically-storing bridging means. In some embodiments, the length-varying means is a means for moving the pivotally-attaching means from a first position to a second position, wherein the first position is closer to the end of the dock than the second position.

In accordance with yet another embodiment of the present invention, a method for bridging the gap between a dock and a vehicle backed into a dock is provided which includes operating a vertically-storing, top-of-dock leveler by moving the top-of-dock leveler between a vertically-stored and a lowered operative position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a vertically-storing, top-of-dock leveler. Such devices in accordance with some embodiments of the invention have the advantage of being more economical to install and provide greater environmental and security control than typical pit-style dock levelers, while also having a greater range of operative positions than typical edge-of-dock and top-of-dock levelers.

Figure 1:
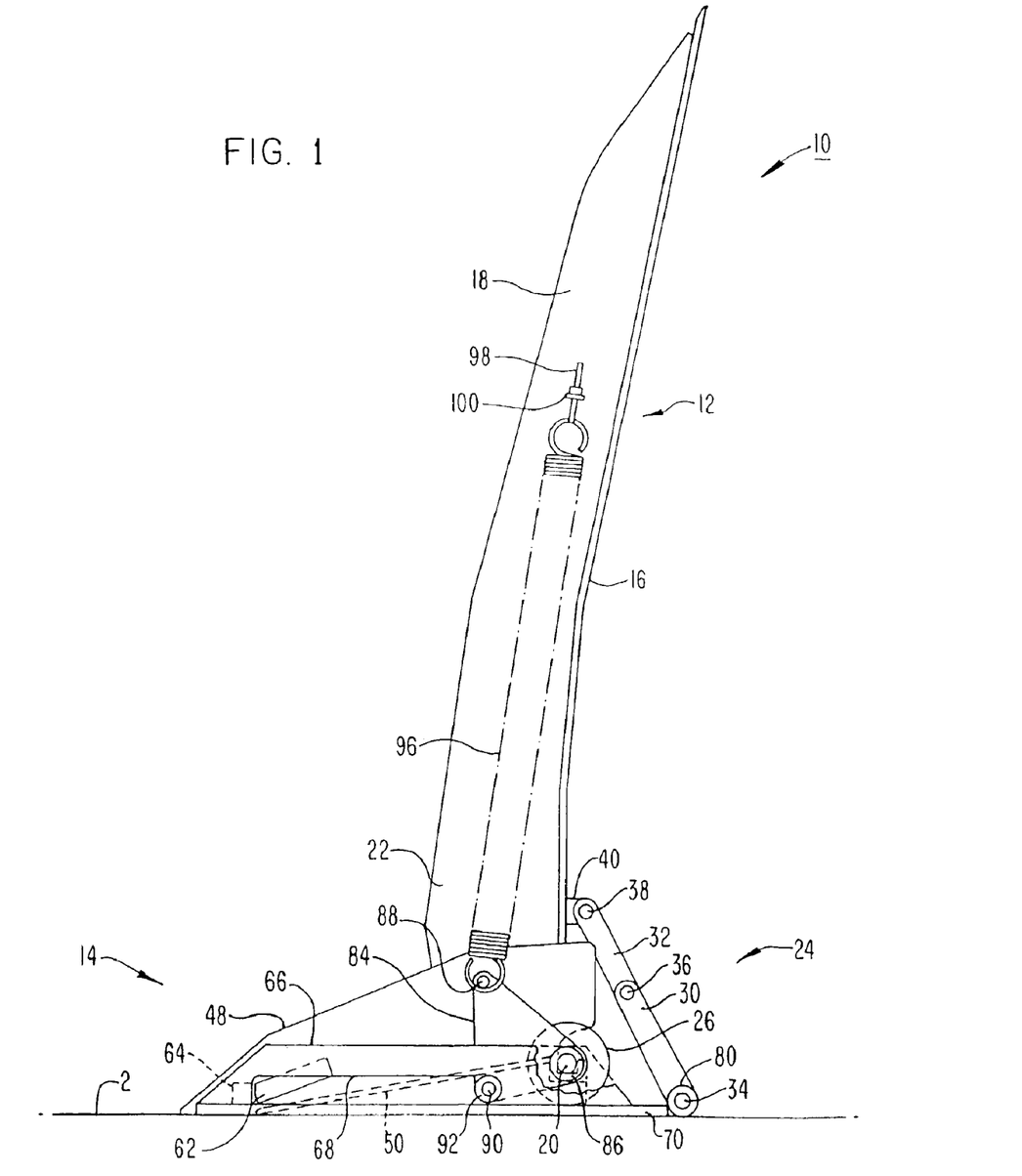
FIG. 1 is a side view illustrating a vertically-storing, top-of-dock leveler according to a preferred embodiment of the invention in the vertically-stored position.
Figure 3:
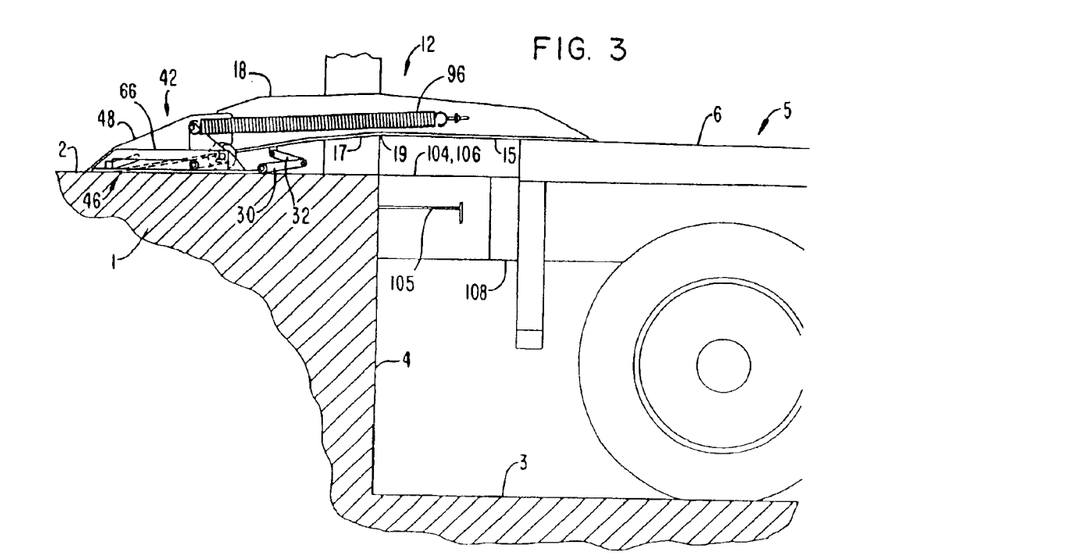
FIG. 3 is a side view of the vertically-storing, top-of-dock leveler of FIG. 1 shown in a lowered, above-dock operative position.

FIG. 1 illustrates a dock leveler 10 in accordance with one embodiment of the present invention. The dock leveler 10 includes a deck assembly 12 pivotally attached to a base assembly 14 and a lock mechanism 24. The deck assembly 12 includes a deck plate 16 supported by side curbs 18, and a pivot shaft 20 attached to the rear end 22 (i.e. the end closest to the base assembly 14 and farthest from the vehicle bed when the deck assembly 12 is in an operative position) of the deck plate 16. The pivot shaft can be supported at each end by a roller 26 that rests on the base assembly 14, and specifically the base plate 70 of the base assembly 14. The deck plate 16 preferably is not flat and occupies at least two planes. When the deck plate 16 occupies two planes, the intersection of the planes preferably is located near the plane of the dock face 4 when the deck plate 16 is in the lowered, substantially horizontal position. As shown in FIG. 3, the deck plate 16 has a first surface 15 occupying a first plane, a second surface 17 occupying a second plane, and the intersection 19 of the first surface 15 and second surface 17 (and consequently the intersection of the first and second planes) is located near the plane of the dock face 4. Such a configuration—i.e. a deck plate configured to occupy more than one plane—enables the dock leveler to achieve a lesser below dock grade as compared to conventional dock levelers having a flat deck plate occupying only a single plane, particularly when the intersection of the planes is located in the plane of the dock face or above the dock floor. A person of ordinary skill will understand from the teachings herein that the deck plate may comprise at least a first or second portion, which may be but are not necessarily planar. Rather, an angle exists between the first and second portion near the plane of the dock face thereby minimizing the grade when the truck is below dock. Thus, for example a first planar portion may extend from the truck bed to a location near the dock face and the second portion may be a curved portion extending to the dock hinge or else a curved portion extending to a planar portion connected to the dock hinge.

Figure 4:
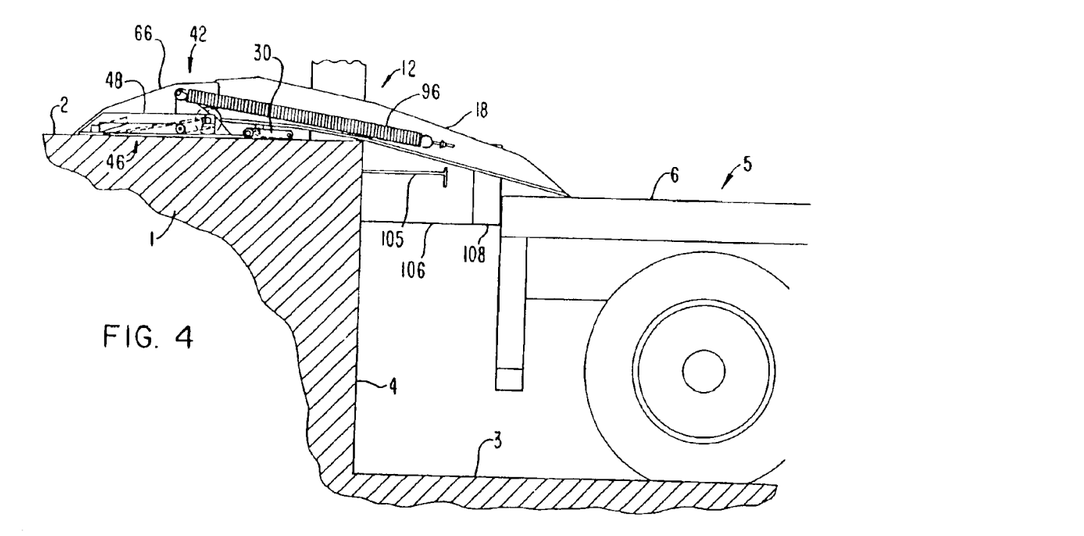
FIG. 4 is a is a side view of the vertically-storing, top-of-dock leveler of FIG. 1 shown in a lowered, below-dock operative position.

Referring back to FIG. 1, the lock mechanism 24 includes a lower link 30 and an upper link 32. The lower link 30 has one end pivoting about a pin 34 carried by the base assembly 14 and the other end pivoting about a pin 36 attached to one end of the upper link 32. The other end of the upper link 32 pivots about a pin 38 carried by a bracket 40 attached to the deck assembly 12. When the deck assembly 12 is in the raised (i.e. vertically-stored) position, the links 30, 32 rotate to an over-center position to lock the deck assembly 12 into the raised position. As shown in FIGS. 3 and 4, the links 30, 32 rotate relative to each other to allow the deck assembly 12 to lower.

Figure 2:
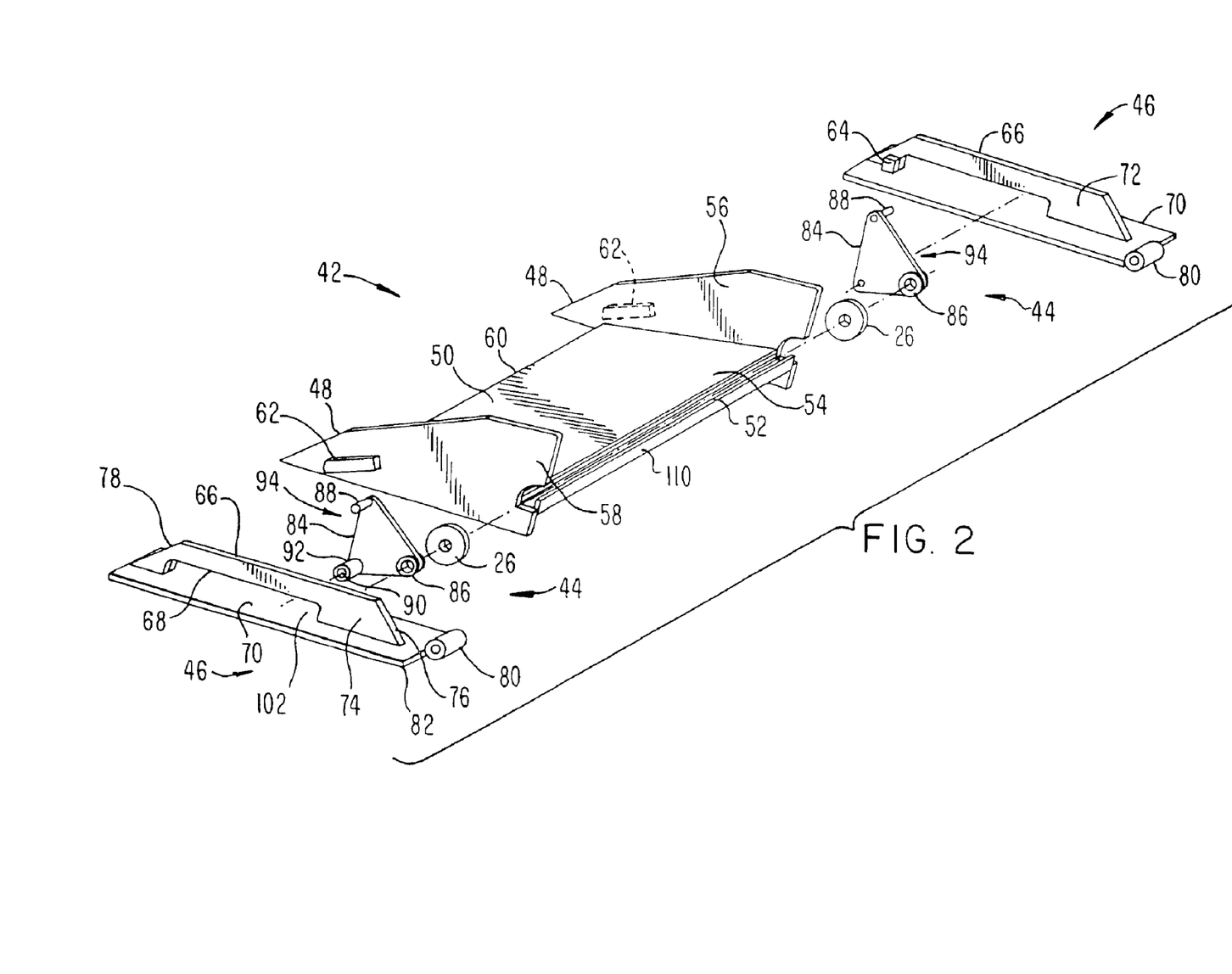
FIG. 2 is an exploded perspective view of the base assembly of the vertically-storing, top-of-dock leveler of FIG. 1.

The base assembly 14, shown in a detailed, exploded view in FIG. 2 includes a ramp assembly 42, two spring anchor assembles 44, and two base plate assemblies 46. The ramp assembly 42 has two side plates 48 supporting an inclined ramp plate 50, and a pivot shaft engagement mechanism 52. In the illustrated embodiment, the pivot shaft engagement mechanism is a support channel and will thus be referred to as a support channel 52 from hereonin. The pivot shaft engagement mechanism need not be a support channel, however; anything that positions the pivot shaft 20 when the ramp assembly 42 is latched, and further allows the pivot shaft 20 to move with the ramp assembly 42 when the ramp assembly is de-latched and moved rearwardly (i.e. away from the face of the dock) can be a pivot shaft engagement mechanism.

The side plates 48 have an inside surface 56 (facing the ramp plate 50), an outside surface 58 (opposite the ramp plate 50), a forward end 54 (the end nearest the dock face 4), and a rear end 60 (the end farthest from the dock face 4). A latch block 62 is attached to the outside surface 58 of each side plate 48 toward the rear end 60 of each side plate 48, for engagement with corresponding latch blocks 64 on the base plate assembly 46.

The inclined ramp plate 50 extends at an upward incline from the dock floor (not shown in FIG. 2) to the pivoting end of the deck assembly 12. The support channel 52 can be formed integrally with the ramp plate 50, or it can be a separate portion attached to the ramp plate 50. As shown in FIG. 2, the forward end 54 (i.e. the end nearest the dock face 4) of the ramp plate 50 rests on the support channel 52. Thus, in the illustrated embodiment, the support channel 52 is a separate portion from the ramp plate 50. The support channel 52 is configured to receive the pivot shaft 20 of the deck assembly 12.

The base plate assemblies 46 each include a side plate 66 with a cam slot 68. Each side plate 66 is mounted to a base plate 70 which is ultimately attached to the dock floor. The side plates 66 have an inside surface 72 (facing the ramp assembly 42), and outside surface 74 (opposite the ramp assembly 42), a forward end 76 (the end nearest the dock face 4), and a rear end 78 (the end farthest the dock face 4). A latch block 64 is attached the inside surface 72 of each base side plate 66 toward the rear end 78 of each base side plate 66 for engagement with the latch blocks 62 of the ramp assembly 42. The base plate assemblies 46 also include a pivot boss 80 attached at the forward end 82 (i.e. the end nearest the dock face 4) of the base plate 70 for receiving the pin 34 which attaches to the lower link 30 enabling pivoting motion.

Each spring anchor assembly 44 includes a plate assembly 94. One plate assembly 94 is mounted on each end of the pivot shaft 20, between the ramp assembly 42 and base plate assembly 46. Each plate assembly 44 has a plate 84, a support bushing 86, a pin 88, and a pin 90 carrying a cam roller 92. The cam roller 92 fits within, and is positioned within, the cam slot 68. Each spring anchor assembly 44 also includes a spring 96 with an upper end fastened to an adjusting bolt 98 attached to a plate 100 mounted on a side curb 18 and a lower end attached to the pin 88 on the plate assembly 94. In some embodiments, rotation of the plate assembly 94 is prevented by the cam roller 92 bearing on the cam surface 102 of the base plate assembly 46. The locations of the pin 88 and the plate 84, and the rate of the spring 96 are preferably selected so that the deck 16 is upwardly biased when the dock leveler 10 is in the stored position and downwardly biased when the deck assembly 12 is lowered to an operative position.

Figure 6:
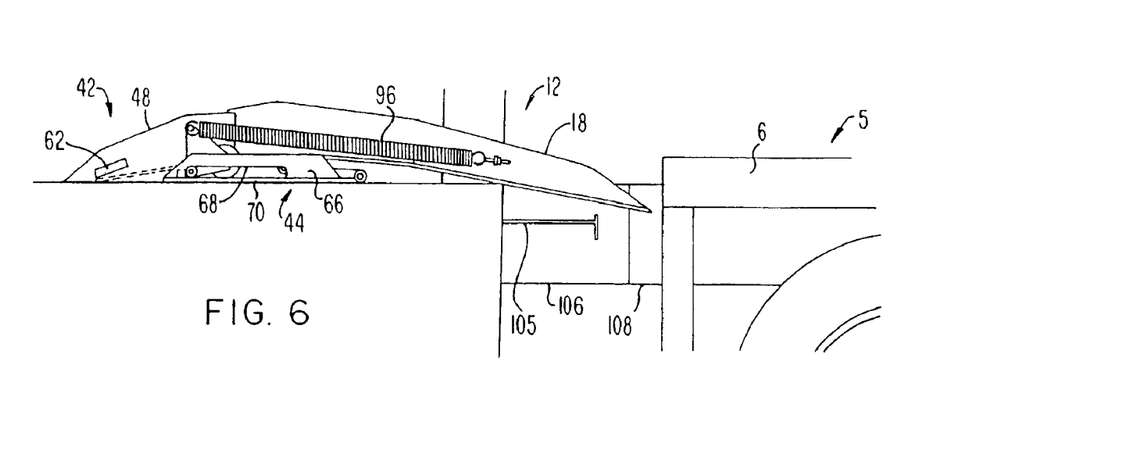
FIG. 6 is a side view of the vertically-storing, top-of-dock leveler of FIG. 1 shown in a lowered, operative position with the ramp and the deck moved away from the dock face for end-loading.

Whereas FIG. 1 illustrates the dock leveler in a stored position, FIGS. 3, 4, and 6 illustrate the same dock leveler installed on the top surface (or floor) 2 of a dock 1 with a vehicle 5 parked on the dock driveway 3 and backed against the bumpers 108. On either side of the dock leveler 10, a bumper assembly 104 is attached to the dock face 4. The bumper assembly 104 includes a bumper bracket 106 and a resilient bumper 108. The bumpers 108 protect the dock face 4 from impact and position the transport vehicle 5 at the desired position relative to the dock leveler 10. A shelf 105 is supported between the bumper assemblies 104.

As FIGS. 1, 3, and 4 indicate, the dock leveler 10 is adapted to bridge the gap between the loading dock 1 and the bed 6 of a transport vehicle 5 parked in front of the loading dock 1. As discussed above, the dock leveler 10 includes two base plate assemblies 46 mounted on the dock floor 2, a ramp assembly 42 resting on the dock floor 2 between the two base plate assemblies 46, and a deck assembly 12 pivoted to the base ramp assembly 42 and base plate assemblies 46. The deck assembly 12 is moveable between a generally vertical stored position to a lowered, generally horizontal operative position that may be upwardly inclined or downwardly declined to provide a bridge from the dock floor 2 to a transport vehicle bed 6 that may be higher or lower than the dock floor 2. FIG. 1 illustrates the dock leveler in the stored position. FIG. 3 illustrates the dock leveler in a lowered, above-dock operative position. FIG. 4 illustrates the dock leveler in a lowered, below-dock operative position.

FIG. 6 illustrates the dock leveler 10 in another lowered operative position for accommodating an end-loading condition. In normal operation, the ramp assembly 42 is prevented from moving by the latch blocks 62 engaging the latch blocks 64 on the base plate assemblies 46. When the links 30, 32 are rotated from the locked over-center position, the deck assembly 12 can be rotated and lowered to an operative position resting on a vehicle bed 6 as illustrated in FIGS. 3 and 4. When cargo is close to the rear of the truck 5, it may interfere with the end of the deck assembly 12 and prevent the deck assembly 12 from resting on the bed of the truck 6. This is known as an end-loading condition.

Figure 5:
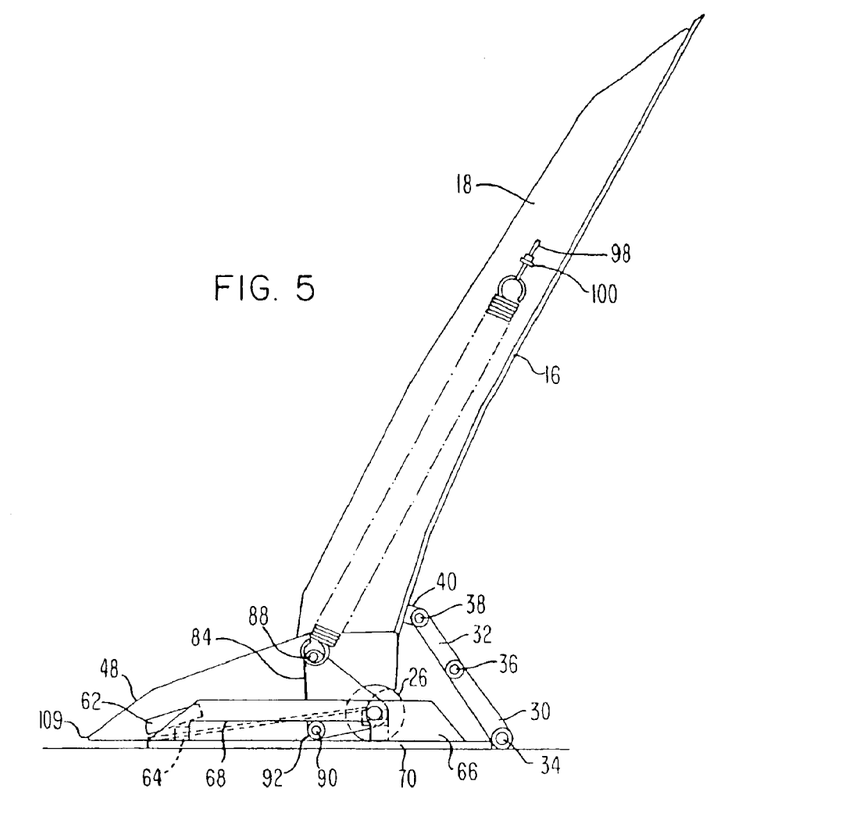
FIG. 5 is a side view of the vertically-storing, top-of-dock leveler of FIG. 1 shown in a partially-lowered position with the ramp and the base of the dock leveler moving away from the face of the dock.

To allow the deck assembly 12 to be lowered for end loading, the links 30, 32 remain locked in the over-center position. The rear 109 of the ramp assembly 42 is raised to disengage the latch blocks 62 from the latch blocks 64. When the deck assembly 12 is pushed rearward and pivoted toward a lowered position, the links 30, 32 cause the pivot shaft 20 and the ramp assembly 42 to move rearward. This is illustrated in FIG. 5. The rollers 26 bearing on the base plates 70 carry the weight of the deck assembly 12. The spring plate assembly 94 also moves rearward with the pivot shaft 20. The cam roller 92 moves along the cam surface 102 to maintain the angular position of the spring plate assembly 94 and thus the counterbalance force of the springs 96 is not affected by the position of the pivot shaft 20. Preferably, when the deck assembly 12 is lowered to an operative position, it does not protrude beyond the front face of the bumpers 108 and end-loading can be performed as illustrated in FIG. 6. A person of ordinary skill in the art will appreciate that although the illustrated embodiments refer to manual mechanisms for raising and lowering the deck assembly 12, dock leveler operation can also be accomplished mechanically by means known in the art, for example by hydraulic or electric actuating mechanisms.

When the deck assembly 12 is raised, the pivot shaft 20 moves forward to the normal position shown in FIG. 1. The front leg 110 of the support channel 52 engages the pivot shaft 20 and causes the ramp assembly 42 to move forward. When the ramp assembly 42 is fully forward the latch blocks 62 engage the latch blocks 64 on the base plate assemblies 46 and secure the ramp assembly 42 and the pivot shaft 20 in the normal position.

FIGS. 7–10 illustrate a dock leveler 200 according to another embodiment of the present invention.

Figure 7:
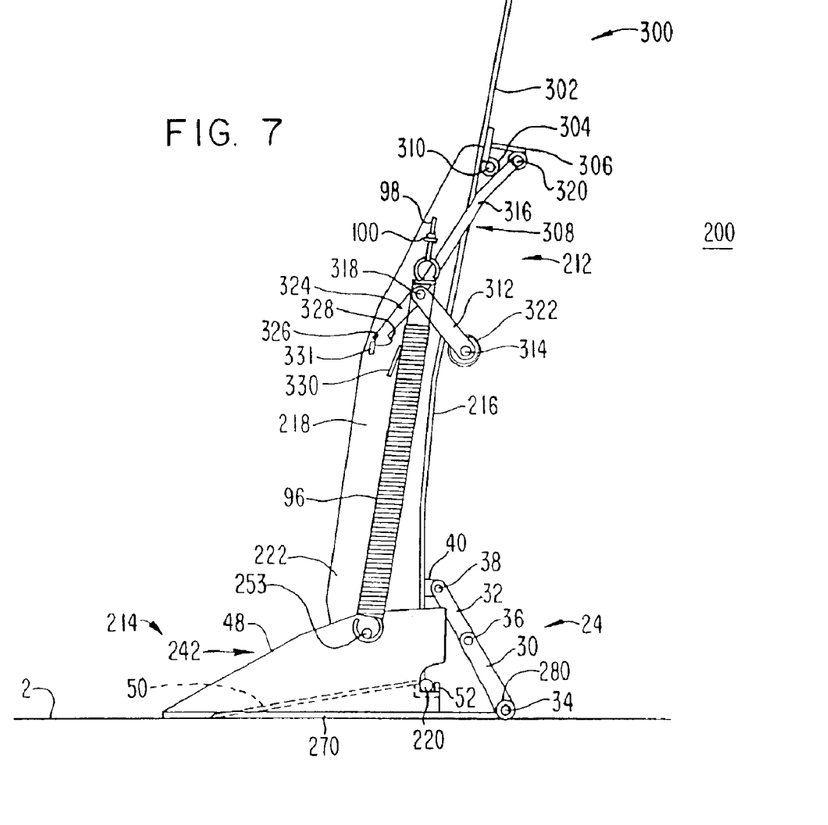
FIG. 7 is a side view illustrating a vertically-storing, top-of-dock leveler according to another preferred embodiment of the invention in the vertically-stored position, with the lip extended.

The dock leveler 200 includes a deck assembly 212, base assembly 214, lip assembly 300, and lock mechanism 24. The deck assembly 212 is similar to the deck assembly 12 shown in FIG. 1 and includes a deck plate 216 supported between two side curbs 218, and a pivot shaft 220 attached to the rear end 222 of the deck plate 216.

The base assembly 214, similar to the base assembly 14 of FIG. 1, includes a ramp assembly 242. However, rather than having base plate assemblies configured for attachment to the top surface of a dock, the ramp assembly itself is configured for attachment to the top surface of a dock. The ramp assembly 242 has two side plates 48 supporting an inclined ramp plate 50, and a support channel 52 for receiving the pivot shaft 220. The base assembly 214 also includes a base plate 270 that is attached to the dock floor 2.

A pivot boss 280 is attached at the forward end of the base plate 270 for receiving the pin 34 which attaches to the lower link 30 of the lock mechanism 24.

In lieu of the spring anchor assembly 44 in the embodiment of FIG. 1, the dock leveler 200 has a spring 96 with an upper end fastened to an adjusting bolt 98 attached to a plate 100 mounted on a side curb 218 and a lower end attached to a pin 253 attached to the outside (i.e. the side opposite the inclined ramp plate 50) of each side plate 48. The locations of the pin 253 and the plate 100 and the rate of the spring 96 are selected so that the deck assembly 212 is upwardly biased when the deck plate 216 is in the stored position and downwardly biased when the deck plate 216 is lowered to an operative position.

Figure 8:
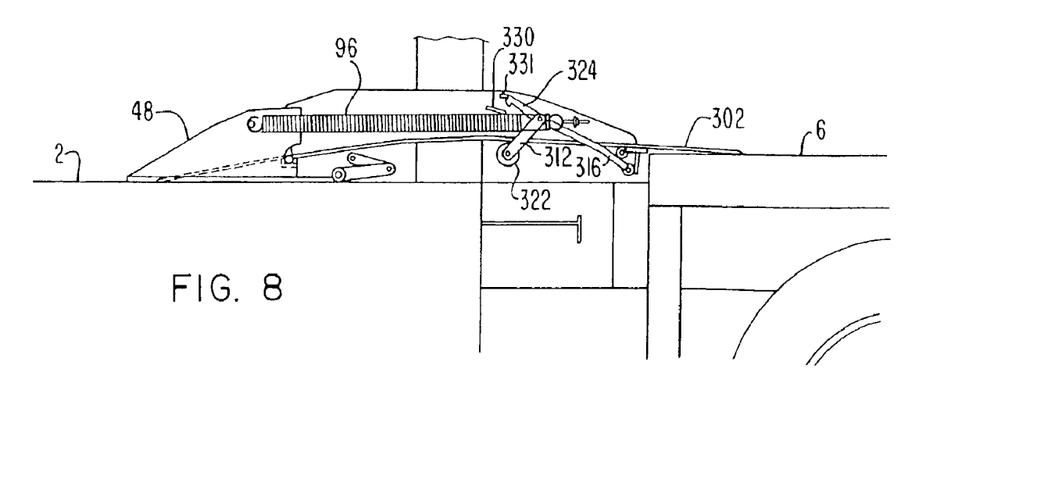
FIG. 8 is a side view illustrating the vertically-storing, top-of-dock leveler of FIG. 7 in a lowered, operative position with the lip extended.
Figure 9:
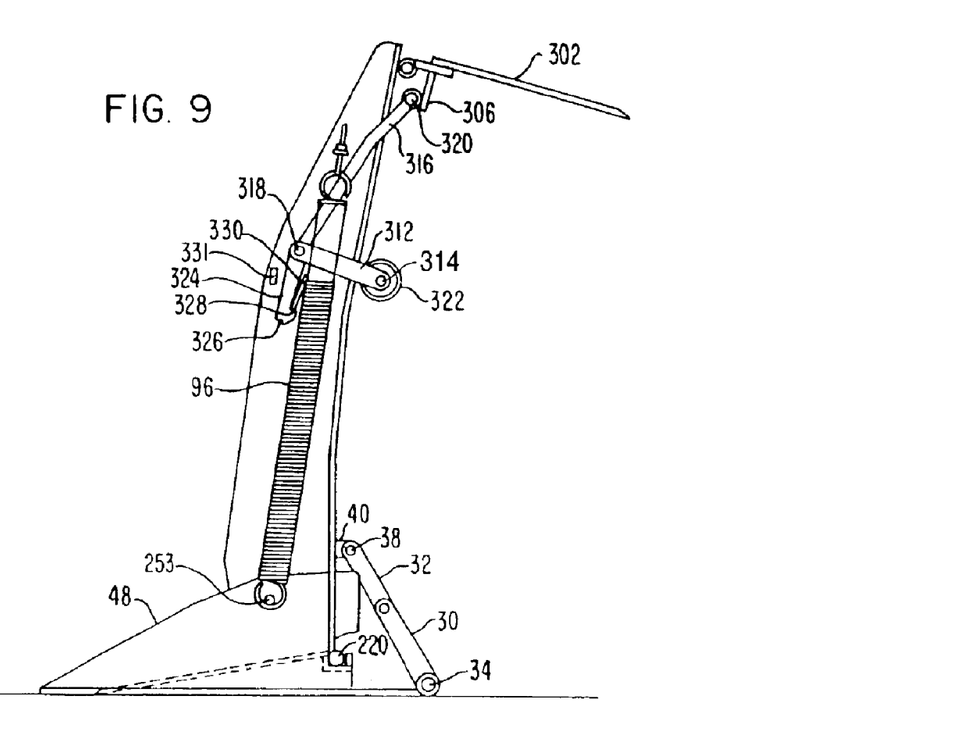
FIG. 9 is a side view illustrating the vertically-storing, top-of-dock leveler of FIG. 7 in the vertically-stored position, with the lip retracted.
Figure 10:
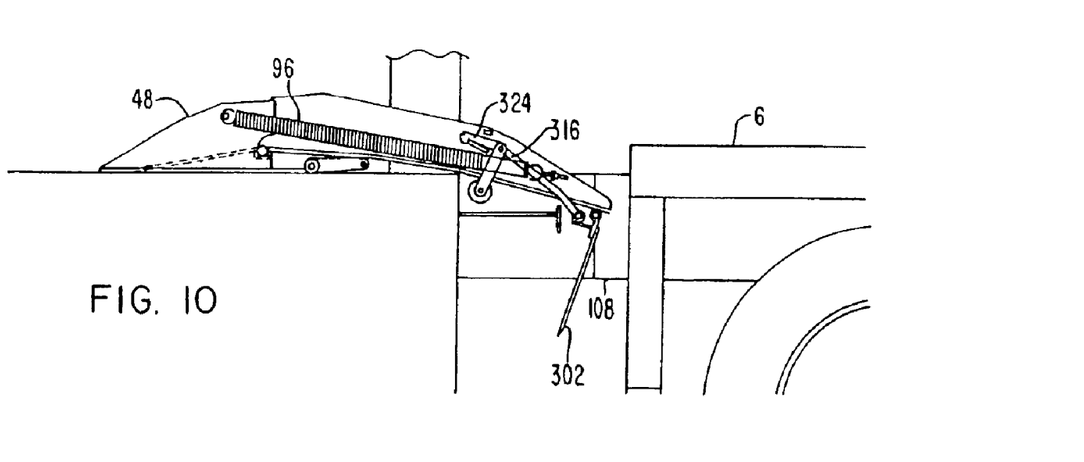
FIG. 10 is a side view illustrating the vertically-storing, top-of-dock leveler of FIG. 7 in a lowered, operative position with the lip retracted.

The lip assembly 300 includes a lip plate 302, hinge tubes 304, a lip arm 306, and counterbalancing mechanism 308. The lip assembly 300 is attached to the deck assembly 212 by a hinge pin 310. To reduce the effort required to rotate the lip plate 302 from the retracted position ( i.e. perpendicular to the deck plate 216, as shown in FIG. 9) to the extended position (i.e. parallel to the deck plate 216, as shown in FIG. 7), the weight of the of the lip plate 302 is partially counterbalanced. A crank arm 312 is attached to a shaft 314 mounted on the deck assembly 212. A link 316 is attached at one end to the crank arm 312 by a pin 318 and at the other end to the lip arm 306 by a pin 320. A torsion spring 322 biases the crank arm 312 in a clockwise direction to urge the lip plate 302 to rotate in a counterclockwise direction toward the extended position. A lip latch 324 has two latching surfaces 326, 328. When the lip plate 302 is rotated to the extended position, as shown in FIGS. 7 and 8, the latch surface 326 engages a latch block 331 on the deck assembly 212 and prevents the lip plate 302 from rotating toward the retracted position. When the lip plate 302 is retracted as shown in FIGS. 9 and 10, the latch surface 328 engages a latch block 330 on the deck assembly 212 and prevents the lip plate 302 from rotating toward the extended position.

As with the embodiment of FIG. 1, in the embodiment of FIG. 7, the deck assembly 212 is moveable between a generally vertical, stored position and a generally horizontal, operative position. The generally horizontal, operative position may be upwardly inclined or downwardly declined to provide a bridge from the dock floor to a transport vehicle that may be higher or lower than the dock floor. FIG. 7 illustrates the dock leveler 200 in the stored position with the lip assembly 300 extended. FIG. 9 illustrates the dock leveler 200 in the stored position with the lip assembly 300 retracted. FIG. 8 illustrates the dock leveler in the substantially horizontal, lowered operative position with the lip extended.

In normal operation, the links 30, 32 are rotated from the locked over-center position and the deck assembly 212 is pushed forward to rotate to a lowered operative position with the lip plate 302 resting on the bed 6 of a truck 5 as shown in FIG. 8. When cargo is close to the rear of the truck 5, it may interfere with the end of the lip plate 302. End-loading can be performed by releasing the lip latch 324 and rotating the lip plate 302 forward to the retracted position as illustrated in FIG. 9. Thus, when the deck assembly 212 is lowered the lip plate 302 is behind the bed 6 of the truck 5 as illustrated in FIG. 10.

Thus the dock leveler of FIG. 1 and the dock leveler of FIG. 7 are examples of embodiments of vertically-storing, top-of-dock levelers according to the present invention that can accommodate end loading conditions. According to the embodiment of FIG. 1, end loading is accommodated by shifting the pivot point of the deck assembly farther from the dock face 4. Preferably the pivot point is shifted to an extent whereby the dock leveler does not protrude past the face of the dock bumper 108. According to the embodiment of FIG. 7, the bridge between the dock and the vehicle bed is effectively shortened through use of a pivoting lip mechanism—the bridge is longer when the lip is extended and shorter when the lip is retracted.

Figure 11:
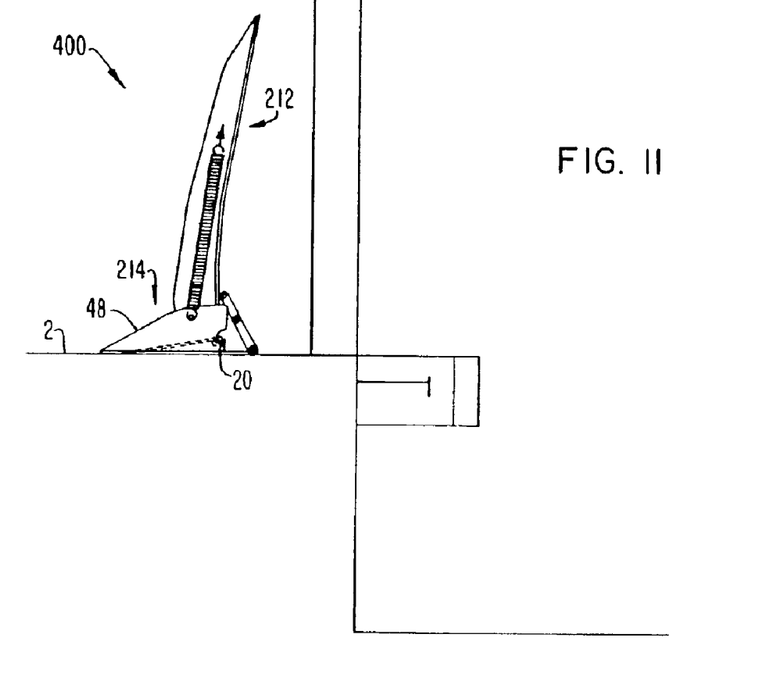
FIG. 11 is a side view illustrating a vertically-storing, top-of-dock leveler in accordance with yet another preferred embodiment of the present invention in the vertically-stored position.
Figure 12:
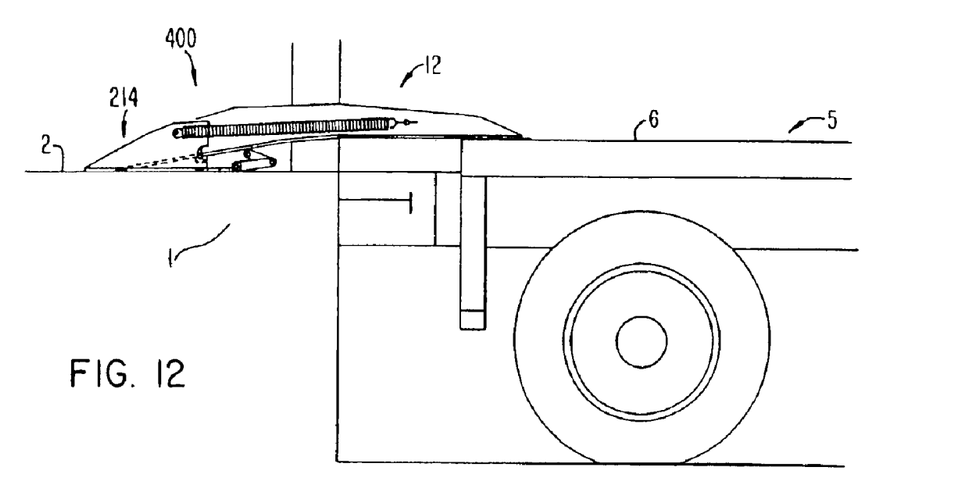
FIG. 12 is side view of the vertically-storing, top-of-dock leveler of FIG. 11 in a lowered, operative position.

FIGS. 11 and 12 illustrate a dock leveler 400 according to yet another embodiment of the present invention. FIG. 1 illustrates the dock leveler 400 in a vertically-stored position, attached to the dock floor 2. FIG. 12 illustrates the dock leveler 400 in a substantially horizontal, lowered operative position, resting on the bed 6 of a vehicle 5 backed against the dock. The dock leveler 400 is a combination of the dock levelers 10, 200 shown in FIGS. 1 and 7 in that it has the deck assembly 12 according to FIG. 1 attached to the base assembly 214 according to FIG. 7. Thus, as illustrated in FIG. 12, the operation of the dock leveler 400 is the similar to the normal operation of the dock levelers of FIGS. 1 and 7. Further, the dock leveler 400 is not designed to accommodate an end-loading condition because the deck assembly 12 pivot axis 20 cannot shift from a first position close to the dock face 4 to a second position farther from the dock face 4, and because the deck assembly 12 does not include a lip assembly.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dock leveler, comprising:
   a base assembly configured to be installed on a substantially level top surface of a dock, wherein the base assembly comprises a ramp assembly having an inclined ramp plate and a pivot shaft engagement mechanism which is either integral with the ramp plate or is a separate component attached to the ramp assembly; and,
   a vertically-storing deck assembly being pivotally attached to the base assembly, wherein the deck assembly comprises a pivot shaft, and the deck assembly has a forward end and a rear end, the forward end being farther from the base assembly than the rear end, and the pivot shaft being attached at the rear end of the deck assembly.

2. The dock leveler according to claim 1, wherein the pivot shaft engagement mechanism comprises a channel portion configured to receive the pivot shaft.

3. The dock leveler according to claim 1, further comprising at least a first spring anchor assembly mounted on a first end of the pivot shaft.

4. The dock leveler according to claim 1, wherein the deck assembly further comprises an extendible lip pivotally attached to the deck assembly.

5. The dock leveler according to claim 1, wherein the inclined ramp plate provides a transition over the pivot shaft.

* * * * *